Sept. 29, 1925.

W. H. PRICHARD ET AL 1,555,701

ICE CREAM FREEZER

Filed Sept. 23, 1924    2 Sheets-Sheet 1

Inventor
Warren H. Prichard
Fred L. Baker

By

Attorney

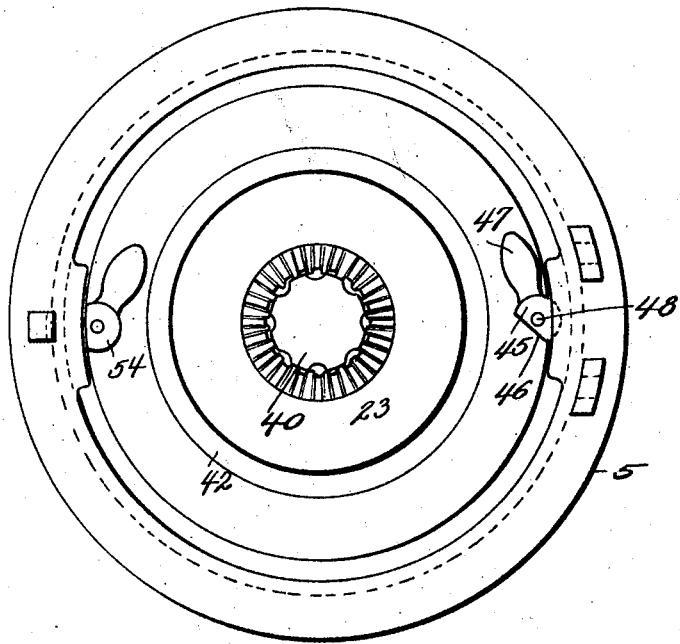
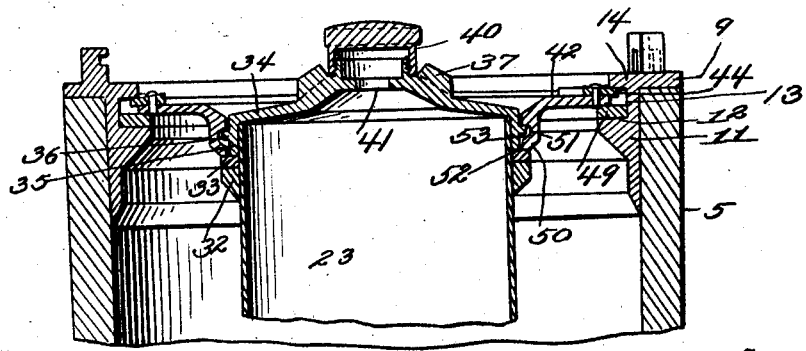

Patented Sept. 29, 1925.

1,555,701

UNITED STATES PATENT OFFICE.

WARREN H. PRICHARD AND FRED L. BAKER, OF WINCHENDON, MASSACHUSETTS, ASSIGNORS TO THE ALASKA FREEZER COMPANY, OF WINCHENDON, MASSACHUSETTS, A COMMON-LAW ASSOCIATION.

ICE-CREAM FREEZER.

Application filed September 23, 1924. Serial No. 739,354.

*To all whom it may concern:*

Be it known that we, WARREN H. PRICHARD and FRED L. BAKER, citizens of the United States, residing at Winchendon, in the county of Worcester and State of Massachusetts, have invented new and useful Improvements in Ice-Cream Freezers, of which the following is a specification.

This invention relates to ice cream freezers, and the primary object of the same is to provide a device of this class wherein means are utilized for excluding the air from the freezing medium or ice packed in the tub around the can subsequent to the freezing operation.

A further object of the invention is to provide an ice cream freezer of the rotating can type having means, as a complemental feature, for excluding air from the freezing medium or mixture, and also for filling the tub with the freezing medium from the top portion thereof.

A further object of the invention is to provide an ice cream freezer of that type comprising a rotating can and a dasher or agitator in the can also rotatable in an opposite direction, or, which under certain conditions, may remain stationary, and under all conditions conserve the freezing medium, or the mixture of ice and salt, to effectively and quickly freeze the mixture within the can by excluding air from the said medium.

A further object of the invention is to provide an ice cream freezer comprising a tub for holding the freezing medium or mixture of salt and ice from which the air is excluded, the can being operative with or without a dasher or mixing means therein.

A still further object of the invention is to provide an ice cream freezer so constructed and arranged that after the cream is frozen and left for ripening, the operating gear frame may be removed and easy access had to the can by a slight turn of the cover, which is then free for separation.

With these and other objects and advantages in view, the invention consists in the construction and arrangement of the several parts which will be more fully hereinafter described and claimed.

In the drawings:

Fig. 3 is a top plan view of the can, tub and closing means with all of the operating mechanism removed and illustrating the condition in which the can will remain after the freezing process has been completed.

Fig. 4 is a transverse vertical section of the upper portion of the can, tub and closing means as shown by Fig. 3.

Figure 1:
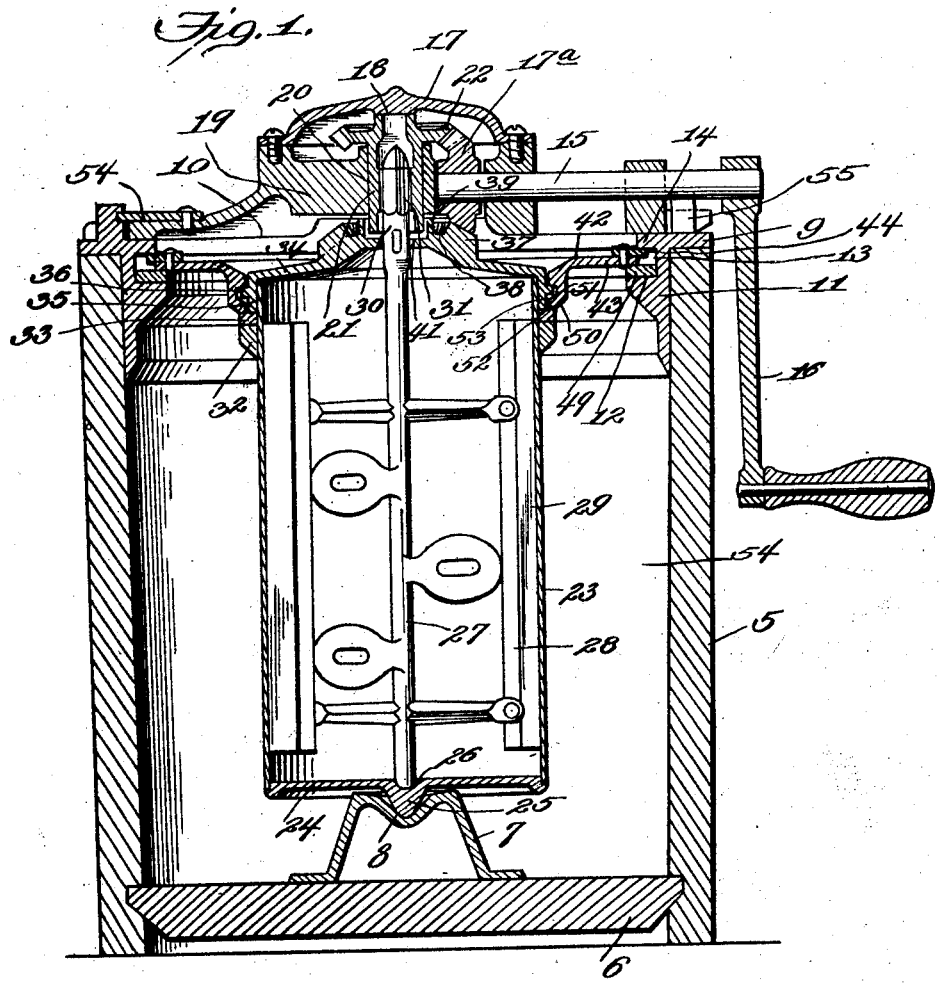
Fig. 1 is a transverse vertical section of an ice cream freezer embodying the features of the invention.
Figure 2:
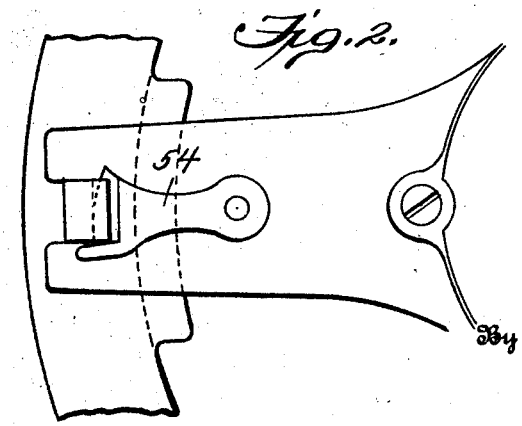
Fig. 2 is a top plan view of portions of the improved freezer.

The numeral 5 designates a tub or outer receptacle, preferably formed of wood and provided with a bottom 6 having a bearing center or foot 7 secured therein and also having a top bearing socket 8. On the upper edge of the body of the tub 5 is an outer metal ring 9, which fully covers the said upper edge of the tub and has the gear frame 10 mounted thereon. The outer ring 9 has a depending flange 11, which snugly bears against the inner upper portion of the tub 5 and is formed with an annular shoulder 12, which serves as the lower wall of an annular recess 13 having the top of the ring partially projecting thereover as at 14 to form an upper wall and an overhanging shoulder. Included in the gear frame and having suitable bearing therein is a drive shaft 15 provided on its outer end with an operating crank handle 16 and having a beveled gear 17ª fastened to the inner end thereof. Over the top of the gear frame a cap 17 is removably mounted and is provided with an inner downwardly projecting center boss 18, this cap 17 being positioned over a center web or member 19 having a bore 20 therethrough to receive the tubular hub 21 carrying an upper beveled gear 22. Within the center of the tub or receptacle 5 a can 23 for holding the mixture to be frozen is disposed, and centrally depending from the bottom 24 of the said can is a tapered bearing lug 25, which loosely fits in the socket 8 of the center bearing or foot 7. In the upper side of the can bottom 24 over the bearing lug 25 a socket 26 is also formed, to loosely receive the lower end of the shaft 27 of the dasher 28. The dasher 28 is of any approved form and has scrapers 29 attached thereto to closely engage the sides of the can and scrape the cream from the inside of the can as fast as it freezes. These scrapers 29 are preferably formed of wood and are suitably attached to the dasher and with the latter are removable from the can 23. The upper end of the shaft is slightly enlarged as at 30 and formed with an angular or square head 31, to removably interlock with the bore of the hub or sleeve 21, the part of the said bore engaged by the head 31 being of the same contour as the head, so that the gear 22 and tubular hub or sleeve 21 may positively rotate and effect a rotation of the shaft 27 with its dasher 28. The outer side of the can body near the top is provided with an annular ring 32, which provides a circumferential shoulder on which is placed a renewable gasket 33. On the upper end of the can 23 is a removable top cover 34 having a depending flange 35 of such length that the lower edge thereof will firmly bear upon the gasket 33 and form a tight joint, to thus prevent leakage through the can cover into the can of the freezing medium or mixture of ice and salt. The flange 35 of the top or cover 34 of the can also has an outstanding rib 36, for a purpose which will be presently explained. The center of the top or cover 34 is increased in thickness and provided with gear teeth 37, which are held in continual mesh with the beveled gear 17 for rotating the can within the tub or outer receptacle 5. Inside the line or gear teeth a groove 38 is formed, to provide an upstanding collar 39, which is exteriorly screw-threaded to removably receive a closure cap 40, as shown by Figs. 3 and 4, for a purpose which will also be hereinafter more particularly specified. When the can 23 and its top or cover 34 are mounted in the tub for the purpose of receiving and freezing the ice-cream or other mixture therein, the said cap 40 will be removed, so that the upper enlarged extremity 30 and head 31 of the dasher shaft 27 may loosely project through a central opening 41 in the center of the top or cover 34 and also in central relation to the collar 39.

One of the most essential features of the present invention is an inside closing ring 42 having secured adjacent to the outer or peripheral edge of the horizontal member 43 thereof opposite locking devices 44, consisting of partial disks or heads 45 with straight clearance edges 46 and handles 47, the said locking devices being pivotally connected to the member 43 by pins or rivets 48. These heads 45 are so shaped that they will project under the inner overhanging shoulder 14 and lock the ring 42 against accidental separation from engagement with the recess 13 of the outer ring 9 into which the periphery of the said inner closing ring projects. The periphery of the inner closing ring 42 bears on a rubber or other gasket 49 seated on the shoulder 12, and when the locking devices 44 are in engagement with the overhanging shoulder 14, the outer peripheral edge of the inner closing ring is firmly clamped against the said gasket 49, and by this means both a moisture and air-tight joint is provided. The closing ring 42 also comprises an inner depending flange 50 having an inner circumferential recess 51, to receive the rib 36 of the can top or cover 34 and also formed with a lower bearing foot or edge 52, which firmly engages the top portion of the gasket 33, the recess 51 having a lower downwardly sloped wall 53 to permit the said inner closing ring 42 to be easily applied over the cap.

It will be seen that between the can 23 and the inner wall of the tub or outer receptacle 5 a space 54 of considerable dimensions is provided, and this space is continued under the bottom of the can in view of the elevation of the center or foot bearing 7. This space 54 is adapted to receive the freezing medium or mixture of salt and ice, which is inserted through the open top of the tub before the inner closing ring 42 is applied and after the can 23 is positioned in the tub in a manner similar to the assemblage of the ordinary ice-cream freezing cans and tubs. However, the present form of freezer materially differs from prior freezer structures in the provision of means for excluding air from the freezing medium or mixture of salt and ice in the space or chamber 54, and this exclusion of air is through the medium of the inner closing ring 42, which when applied as shown by Fig. 1 fully covers in the top portion of the freezing medium or mixture. In those types of freezers which have been provided with air-excluding means, considerable inconvenience results in filling the tub or space or chamber between the tub and can with the freezing medium or mixture of ice and salt, as the latter has generally been introduced into prior air-excluding freezers through the bottom of the tub. In the present instance, however, it will be noted that the freezing medium or mixture of ice and salt is introduced through the top of the tub, with material advantage in charging the freezer.

The improved ice-cream freezer as heretofore described may be operated with or without the dasher 28 and its shaft 27, and under these conditions it will be readily understood that the gear 17 operates in conjunction with the gear teeth 37 to rotate the can. In other instances it may be desirable to have the dasher 28 and its shaft 27 within the can and the parts will then be arranged as shown particularly by Fig. 1. Another advantage of the present improved freezer is that both the can 23 and the dasher 28 and shaft 27 have rotating movements imparted thereto, the dasher 28 and shaft 27 being rotated in a direction reverse to that of the can, and by this means the operation of freezing will be materially quickened, the dasher functioning as usual to scrape off the cream from the inner wall of the can as fast as it is frozen. Another feature of the present form of ice-cream freezer is that the dasher may be permitted to remain in the can without rotation thereof, which may be accomplished through the removal of the gear 22 without withdrawing the dasher 28 and dasher shaft 27 from the can. In the latter arrangement the can will rotate around the dasher and the dasher will remain stationary.

The gear frame and gear carried thereby as in ordinary ice-cream freezers may be readily removed from the top of the tub, and suitable locking means, as at 54 and 55, are provided to hold the gear frame and operating gearing in place on the top of the tub when desired and readily releasable to take off the said gear frame and gearing, so that the can is held within the tub in an easily accessible position. After the freezing operation the dasher shaft 27 and dasher 28 may be removed by first taking off the top or cover 34 of the can and then reapplying the said cover, it being understood of course that the gear frame and gearing must be first separated from the tub. When the dasher shaft and dasher are removed from the can 23, the opening 41 at the center of the top or cover 34 will be closed by applying the cap 40, so that the frozen cream or contents of the can may be allowed to cure or be kept for some length of time, and in view of the fact that the inner closing ring remains in applied position over the freezing medium or mixture of ice and salt, the length of time in which the frozen cream may be kept without additional freezing medium or mixture of ice and salt will be increased, in view of the fact that air is excluded from the freezing medium and it will not, therefore, melt or become watery as it does when exposed fully to the air. Moreover, the use of the inner ring or closing means 42 is further advantageous during transportation of the packed cream, as the freezing medium is prevented from slopping over the top of the tub and no moisture whatever can pass out around the edges of the said inner ring or closing means in view of the tight engagement thereof with the gaskets 49 and 33.

What is claimed as new is:

1. In an ice cream freezer of the class specified, the combination of a tub, a can for receiving the mixture to be frozen disposed centrally in the tub, an annular chamber being formed between the can and tub for the reception of a refrigerant agitating means separably associated with the tub and can, an inner closure ring having an outer horizontal portion removably connected to the tub and an inner depending flange engaging a portion of the can, and a cover removably applied over the top of the can and having a depending flange separably fitted within the flange of the said ring, the said depending flange of the cover and inner flange of the ring having interfitting means to prevent removal of the can cover until the ring is withdrawn tight joints being formed between the points of engagement of the ring with the tub and the can to provide a sealing means over the refrigerant and exclude air from the latter.

2. In an ice cream freezer of the class specified, the combination of a tub, a can for receiving the mixture to be frozen disposed in the tub and having a removable cover with a depending flange to embrace the upper portion of the can, agitating means separably associated with the tub and can, and an inner closure ring having an outer horizontal portion removably attached to a part of the tub and having an inner depending flange to embrace the flange of the cover, the can having an annular shoulder to support the inner flange of the ring and for engagement by the flange of the cover, a rib and groove joint being formed between the flange of the cover and the inner flange of the ring, tight joints being formed between the points of engagement of the said ring with the tub and can to provide a sealing means over the refrigerant to exclude air from the latter.

3. In an ice cream freezer of the class specified, the combination of a tub, a can for receiving the mixture to be frozen disposed in the tub and having a removable cover with an outer flange to embrace the upper portion of the can, a dasher means and shaft removably mounted in the can, detachable means for rotating the can and shaft, and an inner closure ring having a horizontal outer portion removably connected to the inner upper portion of the tub and also formed with an inner depending flange embracing the flange of the cover of the can to exclude air from the refrigerant interposed between the can and wall of the tub, the can having supporting means on the outer side thereof for engagement by the flange of the cover and the flange of the ring, interfitting joint means being intermediately provided between the flange of the cover and the flange of the ring, tight joints being formed between the points of engagement of the said ring with the tub and the can to provide a sealing means over the refrigerant to exclude air from the latter.

4. In an ice cream freezer of the class specified, the combination of a tub, a can disposed centrally within the tub and having a flanged cover removably fitted over the upper end thereof, a space being provided between the outer surface of the can and inner surface of the tub for receiving a refrigerant, a dasher and dasher shaft removably disposed in relation to the can and cover therefor, means for rotating the can and dasher and comprising a ring resting on the upper edge of the tub and having a depending shouldered flange which extends into the upper portion of the tub, and a closure ring having an outer portion engaging the shoulder of the flange of said means and also having an inner depending flange surrounding and closely embracing the flange of the cover of the can to provide a moisture and air tight joint between the tub and can to exclude air from the refrigerant and also prevent leakage at the top portion of the tub and can.

5. In an ice cream freezer of the class specified, the combination of a tub having a top ring engaging the upper edge thereof and formed with an inner depending recessed and shouldered flange extending into the top portion of the tub, a can centrally disposed in the tub for rotative movement and having a flanged cover removably applied thereto, agitating means removably mounted on the ring and associated with the can and cover, the agitating means being permitted to remain without operation if desired, the can also having a circumferential shoulder adjacent the cover, an inner closure ring having an outer horizontal peripheral portion which is separably secured to the recessed and shouldered flange of the top ring and also having an inner depending flange to embrace the flange of the cover and engage the said shoulder on the can, and gasket devices interposed between the outer and inner edge portions of the can and the shouldered portion of the flange of the top ring.

6. In an ice cream freezer of the class specified, the combination of a tub, a can rotatably disposed in the center of the tub and providing with the latter a space for receiving a refrigerant, the can also having a cover with a central opening and a threaded collar around the opening, a shaft and dasher removably mounted in the can, the shaft extending upwardly through the opening of the cover, gear means removably mounted on the top of the tub for operating the can through the cover and also actuating the dasher shaft, a part of the gear means being removable to render the dasher shaft and dasher inoperative, an inner closure ring having an outer horizontal portion applied to the upper inner portion of the tub with an inner depending flange surrounding a portion of the cover to exclude air from the refrigerant in the said space between the can and tub, and a screw-threaded cap removably applicable to the threaded collar of the cover when the dasher shaft and dasher and a part of the gearings are removed from the can and cover and the tub.

7. In an ice cream freezer of the class specified, the combination with a tub and can mounted therein, a cover for the can having a depending flange, a space for a refrigerant being formed between the can and tub, an inner closure ring for removably surrounding the upper portion of the can and the adjacent inner upper portion of the tub and having an inner depending flange surrounding the flange of the cover, the said depending flange and cover flange having interfitting joint means, a shaft and dasher removably mounted in the can, and gear means removably mounted on the top of the tub above the ring and engaging the upper extremity of the shaft and a portion of the can above the said ring, a portion of the gear means being separable to render the said shaft and dasher inactive with relation to the can when desired.

In testimony whereof we have hereunto set our hands.

WARREN H. PRICHARD.
FRED L. BAKER.